Figure 1:
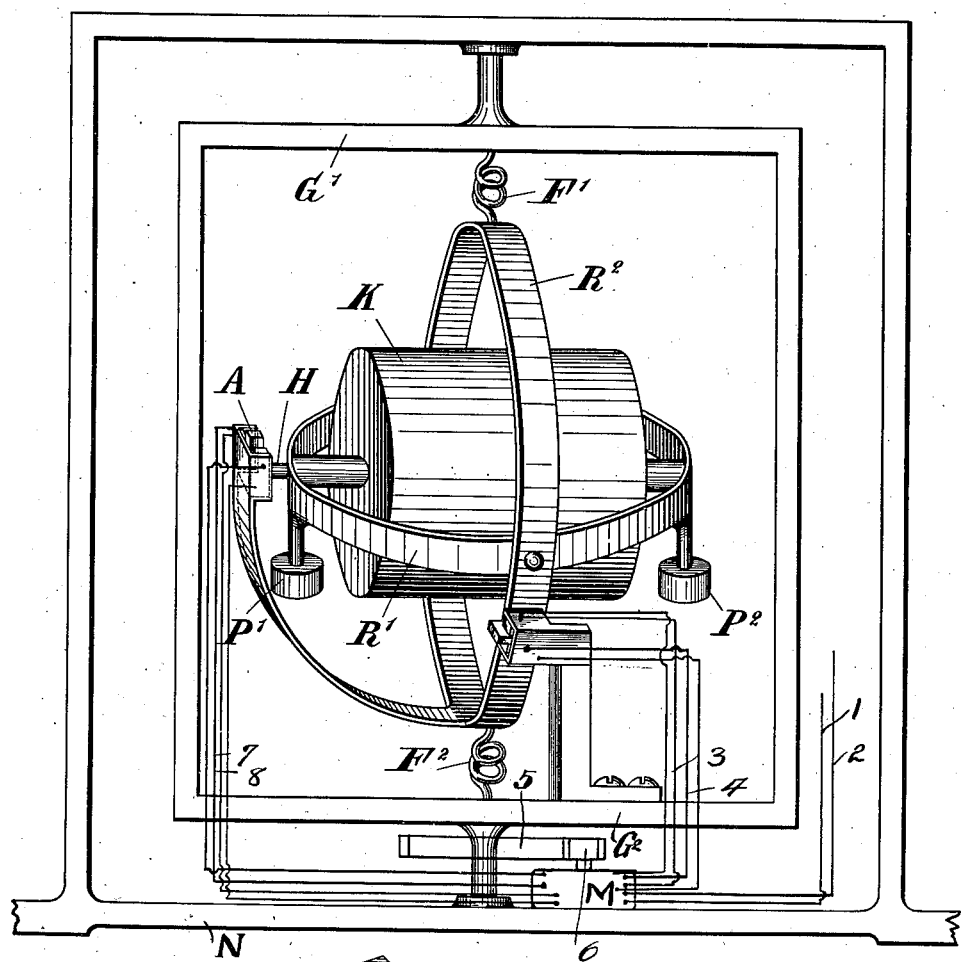

H. USENER.
GYRO-COMPASS.
APPLICATION FILED DEC. 9, 1912.

1,136,566.

Patented Apr. 20, 1915.

UNITED STATES PATENT OFFICE.

HANS USENER, OF KIEL, GERMANY.

GYRO-COMPASS.

1,136,566.  Specification of Letters Patent.  Patented Apr. 20, 1915.

Application filed December 9, 1912. Serial No. 735,667.

*To all whom it may concern:*

Be it known that I, HANS USENER, of Kiel, Kingdom of Prussia, German Empire, a subject of the King of Prussia, and whose post-office address is 62 Holtenauerstrasse, Kiel, Kingdom of Prussia, German Empire, have invented new and useful Improvements in and Relating to Gyro-Compasses, of which the following is a specification.

The invention relates to meridional gyroscopes or gyrocompasses.

It is known that gyrocompasses, i. e. a gyroscope-wheel mounted in a ring which is pivoted in an horizontal axis at right angles to the axis of the wheel, are meridional if the center of the suspension is located above the center of gravity. By the word "meridional" is meant that these gyroscopes have the tendency of making the axle of the gyroscope coincide with the meridian. It is known, moreover, that if there is no friction the axle of the gyroscope oscillates around the meridian and describes an ellipse, similar to a spherical pendulum oscillating around its axle.

The object of the present invention is to provide means to alter these undamped oscillations in such a manner that there results a damped oscillation. For this purpose the outer ring of the usual cardanic suspension of the gyroscope is not freely movable in relation to the casing of the compass but is connected yieldingly with the casing so that each angular displacement of the system, viz. the gyroscope with the two cardanic rings produces a moment about the vertical axle of the casing, which moment has the tendency to compensate for the said displacement. The amount and the direction of the moment (turning couple) depends upon the amount of the angular displacement, and the casing is made rotatable so that it is capable of following the gyroscopical system with a velocity which increases and diminishes according to the amount of the displacement. The means for obtaining this object consist preferably in torsion springs connecting the cardanic suspension with the casing.

The casing is supported by a stationary frame and can be displaced relatively to this frame by means of a motor for instance by a two or three-phase motor. Now in order to obtain this result the velocity of the motion of the casing following the cardanic suspension is made to increase in its amount and direction with the elastic displacement.

It is preferred to interpose a transformer with a movable core between the outer and the inner ring in such a manner that a current is produced the intensity of which is proportional to the elevation; the effect being that according to the sense of the elevation the speed of the motor producing the movement of the casing is increased or reduced.

The invention is illustrated in the drawing.

Figure 2:
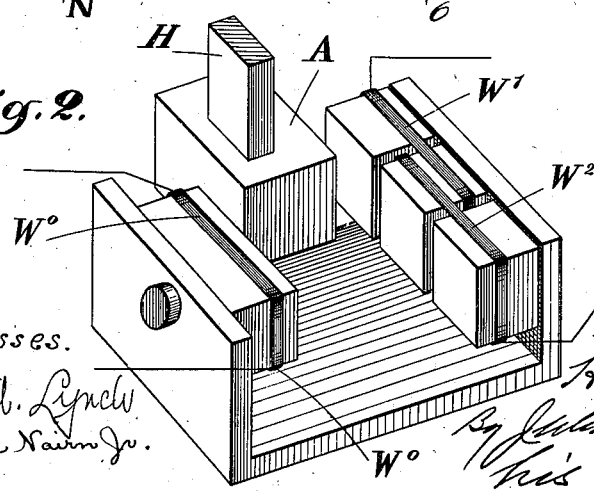

Figure 1 showing the gyroscope and the cardanic suspension with the torsional connection to the case; Fig. 2 showing the type of transformer employed.

Referring to Fig. 1 the gyroscope system comprises as usual the gyroscope wheel K, the inner ring R' and the outer ring $R^2$ of the cardanic suspension. The motor for driving the wheel is not shown in the drawing. The inner ring R' is provided with two weights P' $P^2$ by which the center of gravity is located below the center of the cardanic suspension. The ring R' has therefore the tendency to remain in horizontal position as its center of gravity is by weights P' $P^2$ maintained below its axis of rotation. If the ring is displaced from its horizontal position by a rotation on its pivots (elevation of the axis of the gyroscope) a moment is produced which is proportional to the elevation opposing it. The casing is illustrated as a frame G' $G^2$ vertically pivoted in the structure N which may be rigidly connected with the ship. The form of the casing may be such that it covers and protects the inner parts of the instrument.

As stated before the system is not simply pivotally suspended in the frame but is connected in such a manner that an angular displacement of both parts produces a torsion moment about the vertical axis.

On the drawings the elastic suspension is illustrated by the torsional springs $F^1$ $F^2$. An arm H (Fig. 2) is connected to the ring $R^2$. This arm carries the movable core A of a transformer; the other parts of the transformer being attached to the frame and rigidly connected therewith. The winding on the left-hand ($W^0$) is the primary winding, and the windings on the right-hand ($W^1$ $W^2$) connected in series are the secondary windings. If the core is in a symmetrical position there is no inductive action, but this inductive action increases as the core is displaced from its middle position; the inductive action being of assisting or opposing sense according as the core is displaced to one side or the other. If the yielding displacement of the ring in relation to the casing is zero the core assumes its symmetrical position. Thus if A is in the middle position no current is generated in the opposing coils $W^1$ and $W^2$ but if A covers only the core of $W^1$, or if it covers more of the core $W^1$ than of the core $W^2$, the action of $W^1$ will be stronger than the opposed action of $W^2$. The primary windings $W^0$ of the transformers may connect with the motor M by the conductors 3 and 7, and the secondary windings $W^1$ and $W^2$ in series connect through the conductors 4 and 8.

To produce the movement of the casing relatively to the frame a two-phase motor M is provided, the winding of one phase being always excited by the electric current of the gyro-wheel motor through the conductors 1 and 2 and the other winding being connected to the circuit of the induced part of the transformer relay by the conductors 3 and 4. The motor M is connected to drive the frame ($G^1$ $G^2$) by gear wheels 5 and 6 mounted on said frame and the armature shaft of the motor, respectively. Under these conditions the motor and, therefore, the casing driven thereby will rotate in relation to the frame with a velocity which is proportional in direction and amount to the displacement of the outer ring relatively to the casing.

In order to increase or to reduce the action of the motor it is preferred to locate a second device of similar construction as the first between the outer ring $R^2$ and the inner $R^1$. This device is actuated by the elevation in such a manner that the current produced is proportional in amount and direction to the elevation. This second current through the conductors 7 and 8 may excite a second winding of the second phase of the motor; the current of the second device increasing or reducing the action of the current of the first device.

The manner of operating may be illustrated in connection with a ship at rest. Suppose the gyroscope compass to indicate initially an eastern direction now if the gyroscope wheel is started by the action of the current, the north-pole of the axis of the gyroscope will slowly approach the north-pole of the horizon. At the same time there is an elevation by which the movement to the north-pole is accelerated. At this time the elastic displacement of the ring $R^2$ turned by the axis of the gyroscope against the casing is produced. Therefore the two-phase motor is started in such a sense that the casing follows the movement of the system, the second transformer relay delays this movement on account of the elevation. This condition is stationary, i. e. casing and system are rotating with approximately equal velocity and approximately equal angular displacement. The movement is damped as it now depends only upon the dimension of the two transformers the motors and so on to effect the resulting movement of the gyroscope axis to approach the final position asymptotically. Now suppose the axis having reached the final north-south-position and the ship being turning then a displacement of the casing carried by the ship will take place in relation to the system. The consequence is that the axis of the gyroscope is elevated; the sense of this elevation being dependent from the sense of rotation of the ship. In consequence of the displacement the rotation of the casing will be accelerated by the elevation; the tendency being to compensate for the displacement. In this case the first and second transformer would act in the same sense.

What I do claim as my invention, and desire to secure by Letters Patent of the United States, is:—

1. In a meridional gyroscope-compass the combination with a gyroscope wheel, of a cardanic suspension for said wheel, a rotatable casing yieldingly connected with the suspension, a motor for turning the casing relatively to said suspension and a regulating device for said motor controlled by the elevation of the gyroscope wheel, said regulating device including two coils and means whereby the influence of one circuit is increased and that of the other decreased with shifting of said cardanic suspension.

2. In a meridional gyroscope-compass the combination with a gyroscope wheel, of a cardanic suspension for said wheel, a rotatable casing connected by a torsional spring with the suspension, a motor for turning the casing relatively to said suspension and a regulating device for said motor controlled by the elevation of the gyroscope wheel, said regulating device including two coils and means whereby the influence of one circuit is increased and that of the other decreased with shifting of said cardanic suspension.

3. In a meridional gyroscope-compass the combination with a gyroscope wheel, of a cardanic suspension for said wheel, a rotatable casing yieldingly connected with the suspension, a motor for turning the casing in the same direction as the suspension and a regulating device for said motor controlled by the elevation of the gyroscope wheel, said regulating device including two coils and means whereby the influence of one circuit is increased and that of the other decreased with shifting of said cardanic suspension.

4. In a meridional gyroscope-compass the combination with a gyroscope wheel, of a cardanic suspension for said wheel, a torsional spring a rotatable casing connected by said torsional spring with the suspension, a motor for turning the casing in the same direction as the suspension and a regulating device for said motor controlled by the elevation of the gyroscope wheel, said regulating device including two coils and means whereby the influence of one circuit is increased and that of the other decreased with shifting of said cardanic suspension.

5. In a meridional gyroscope-compass the combination with a gyroscope wheel, of a cardanic suspension for said wheel, a rotatable casing yieldingly connected with the suspension, a motor connected to turn the casing; and regulating transformers associated with said motor, one of said transformers disposed between the casing and the suspension, and the other of said transformers disposed between the elements of said suspension; said transformers being controlled through the movements of the cardanic suspension.

6. In a meridional gyroscope-compass the combination with a gyroscope wheel, of a cardanic suspension for said wheel, a rotatable casing yieldingly connected with the suspension, a motor connected to turn the casing; and regulating transformers associated with said motor, one of said transformers located between the cardanic suspension and the casing and comprising a core and two inducing windings mounted on said cardanic suspension and casing respectively; and the other of said transformers located between the elements of the cardanic suspension and comprising a core and two inducing windings mounted on said elements respectively; said transformers being controlled through the movements of the cardanic suspension.

In testimony whereof I have hereunto set my hand in presence of two subscribing witnesses.

HANS USENER.

Witnesses:
 JOHANNA STERN,
 RICHARD LENY.